United States Patent
Matsumoto

(10) Patent No.: US 6,792,985 B2
(45) Date of Patent: Sep. 21, 2004

(54) PNEUMATIC TIRE INCLUDING BLOCKS EACH PROVIDED WITH CUT-SLOPE

(75) Inventor: Tadao Matsumoto, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 1 day.

(21) Appl. No.: 10/001,957

(22) Filed: Dec. 5, 2001

(65) Prior Publication Data

US 2002/0100526 A1 Aug. 1, 2002

(30) Foreign Application Priority Data

Dec. 6, 2000 (JP) ........................................ 2000-371764

(51) Int. Cl.[7] ...................... B60C 11/03; B60C 107/00; B60C 111/00
(52) U.S. Cl. ................. 152/209.8; 152/209.15
(58) Field of Search ................. 152/209.15, 209.8, 152/209.9, 209.21, 209.24

(56) References Cited

U.S. PATENT DOCUMENTS 4,796,683 A * 1/1989 Kawabata et al.
5,031,680 A * 7/1991 Kajikawa et al.
5,109,903 A * 5/1992 Watanabe et al.

FOREIGN PATENT DOCUMENTS

| EP | 0 354 718 | | 2/1990 |
| EP | 475929 | * | 3/1992 |
| EP | 1 110 761 A2 | | 6/2001 |
| FR | 1 443 693 | | 6/1966 |
| JP | 3-271006 | * | 12/1991 |
| JP | 6-171312 | * | 6/1994 |
| JP | 11-227420 | * | 8/1999 |

* cited by examiner

Primary Examiner—Steven D. Maki
(74) Attorney, Agent, or Firm—Birch, Stewart, Kolasch & Birch, LLP

(57) ABSTRACT

A pneumatic tire comprises a tread portion provided with at least one longitudinal groove extending in the tire circumferential direction and blocks adjacent to one side of the at least one longitudinal groove, each of the blocks being provided with a cut-slope on a corner between the block's top surface and a lateral face facing the longitudinal groove, the cut-slope inclining towards the bottom of the longitudinal groove, and the axial width of the cut-slope gradually decreasing from a middle point of the cut-slope towards each side thereof in the circumferential direction, whereby the vehicle overturn marginal during high speed running is improved.

10 Claims, 4 Drawing Sheets

PNEUMATIC TIRE INCLUDING BLOCKS EACH PROVIDED WITH CUT-SLOPE

The present invention relates to a pneumatic tire more particularly to an improved tread pattern being capable of preventing accidental overturn of a vehicle during high speed running.

Usually, users of recreational vehicles prefer radial tires having block-type tread patterns to rib pattern tires. In the case of recreational vehicles, as the load of a block is generally heavy in comparison with passenger cars, it is necessary to increase the rigidity of the blocks in order to provide wear resistance, tear-off resistance, steering stability and the like.

When a recreational vehicle having a center of gravity that is relatively high is provided with tires having rigid tread blocks, the vehicle will be most likely in danger of overturn if the driver quickly cuts the steering wheel during running at a high speed or makes a high speed cornering.

It is therefore, an object of the present invention to provide a pneumatic tire, in which the marginal performance with regard to vehicle overturn due to high speed is improved without deteriorating other performance such as wear resistance and tear-off resistance of the blocks, steering stability and the like.

According to the present invention, a pneumatic tire comprises
a tread portion provided with a longitudinal groove extending in the tire circumferential direction and blocks adjacent to one side of the longitudinal groove,
each of the blocks provided with a cut-slope on a corner between the top surface and a lateral face of the block, the lateral face facing the longitudinal groove,
the cut-slope inclining towards the bottom of the longitudinal groove, and
the axial width of the cut-slope gradually decreasing from a middle point of the cut-slope towards each side thereof in the circumferential direction.

Embodiments of the present invention will now be described in detail in conjunction with the accompanying drawings.

A pneumatic tire 1 according to the present invention comprises a tread portion 2, a pair of axially spaced bead portions, a pair of sidewall portions, a carcass extending between the bead portions, and a tread reinforcing belt disposed radially outside the crown portion of the carcass as usual.

Figure 1:
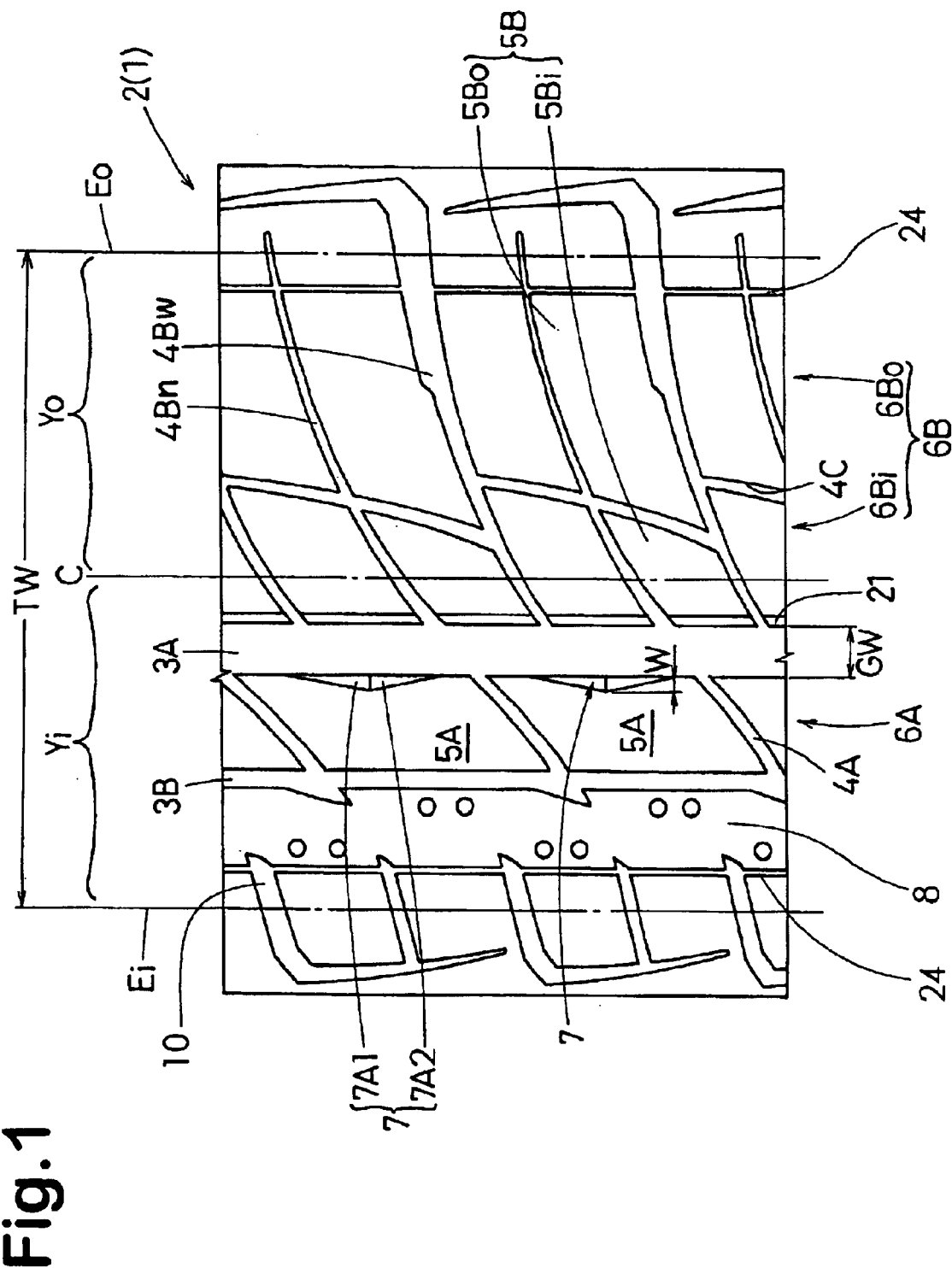
FIG. 1 is a developed partial plan view of a pneumatic tire showing an example of the tread pattern according to the present invention.

The pneumatic tire 1 is a radial tire for recreational vehicles such as minivan. Therefore, in comparison with passenger car tires, a load on a tread element such as block and rib is heavier and a higher rigidity is required therefor. In order to achieve such higher rigidity and a higher aquaplane resistance at the same time, as shown in FIG. 1, an outside half Yo of the tread portion 2 between the tire equator C and an outside tread edge Eo and an inside half Yi of the tread portion 2 between the tire equator C and an inside tread edges Ei are provided with different tread patterns. Here, the "outside" and "inside" are used to mean the designed use of the tire in which the outside half Yo and inside half Yi are positioned on the outside and inside of the vehicle, respectively.

In this embodiment, further, the tread groove arrangement forms a directionally bound tread pattern.

The pneumatic tire 1 is provided with a round shoulder not a square shoulder. Thus, the definition of the above-mentioned tread edges Ei and Eo is firstly made as follows together with that of the undermentioned tread width TW. The tread edges Ei and Eo are the axial edges of the ground contacting region under a standard loaded condition in which the tire is mounted on a standard rim and inflated to a standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. The tread width TW is defined as the axial distance between the tread edge Ei and Eo.

In FIG. 1, the outside tread half Yo is provided with blocks 5B (5Bo, 5Bi) whose rigidity is higher in the tire axial direction than the tire circumferential direction. The inside tread half Yi is, on the other hand, provided with a circumferentially continuous rib 8 and blocks 5A whose rigidity is higher in the tire circumferential direction than the tire axial direction.

In the inside tread half Yi, there are disposed a wide longitudinal groove 3A near the tire equator C, and a narrow longitudinal groove 3B on the inside tread edge Ei side thereof. The longitudinal grooves 3A and 3B are formed as a substantially straight groove to provide a good drainage to improve wet performance.

Such longitudinal grooves 3A, 3B are not provided in the outside tread half Yo.

Between the longitudinal grooves 3A and 3B, lateral grooves 4A are disposed at variable pitches so as to form the above-mentioned blocks 5A arranged in a circumferential row 6A. The lateral grooves 4A are inclined in the same direction and slightly curved. In FIG. 1, the inclination is right side upward, and the curvature is convex toward the underside. As a result, the shape of each block 5A is generally a parallelogram in which the circumferential length is greater than the axial width.

Near the inside tread edge Ei, a circumferentially extending groove 24 which is shallow and fine and thus does not have the function of drainage, is disposed along the inside tread edge Ei. Further, lateral grooves 10 extending from this fine shallow groove 24 beyond the inside tread edge Ei along the curved surface of the rounded tire shoulder are disposed for the off-road traction performance. Accordingly, the part between the narrow longitudinal groove 3B and the inside tread edge Ei forms the above-mentioned circumferentially continuous rib 8.

On the other hand, the outside tread half Yb is crossed by lateral grooves 4B extending from the wide longitudinal groove 3A to the outside tread edge Eo. The lateral grooves 4B in this example include circumferentially alternating grooves 4Bw and grooves 4Bn, the grooves 4Bw gradually widening towards the outside tread edge Eo and the grooves 4Bn gradually narrowing towards the outside tread edge Eo. The lateral grooves 4B are inclined in the same direction and slightly curved. In FIG. 1, the inclination is right side upward, and the curvature is convex toward the upside. The inclination is the same as the lateral grooves 4A but the curvature is in reverse. The lateral grooves 4Bn are aligned with the lateral grooves 4A, thus, the circumferential pitches are the same as those of the lateral grooves 4A. Accordingly, the number of the pitches is twice the number of the pitches of the lateral grooves 4A. By the lateral grooves 4B, the part between the first longitudinal groove 3A and the outside tread edge Eo is divided into blocks 5B.

The outside tread half Yo is further provided with oblique grooves 4C for the purpose of drainage. Each of the oblique grooves 4C extends from one of the widening lateral grooves 4Bw to the adjacent widening lateral groove 4Bw across one of the narrowing lateral grooves 4Bn, while slightly inclining one direction with respect to the tire circumferential direction. The inclining direction is the same as those of the lateral grooves 4A and 4B. Thus, the above-mentioned blocks 5B are each subdivided into an inside block 5Bi and an outside block 5Bo. Each of the inside blocks 5Bi and outside blocks 5Bo is substantially a quadrilateral such that the axial width is larger than the circumferential length.

Near the outside tread edge Eo, the above-mentioned fine shallow groove 24 is disposed therealong.

These fine shallow grooves 24 extend straight and have a width of not more than 2.5 mm and a depth of lass than 5 mm, whereby the wandering performance, uneven shoulder wear and the like may be improved.

The above-mentioned longitudinal grooves 3A and 3B and lateral grooves 4A and 4B and oblique grooves 4C are each defined as having a width of more than 2.5 mm.

The wide longitudinal groove 3A has a width GW at the groove bottom in a range of from 5 to 10% of the tread width TW. The width at the groove top may be the same as or greater than the bottom width GW. The narrow longitudinal groove 3B in this example is about one third of the wide longitudinal groove 3A. Incidentally, a very fine groove having a width of about 1 mm or less and a cut having no substantial width are called "sipe".

By the above-explained tread groove arrangement, a high degree of drainage and a high rigidity of the tread pattern can be obtained at the same time, and it becomes possible to improve both the wet performance, steering stability and the like.

According to the present invention, in order to improve the margin of vehicle overturn, a cut-slope 7 is provided on specific blocks. It is important that blocks which are disposed within the inside tread half Yi and nearest to the tire equator C in a circumferential position, are each provided on an edge on the tire equator side with a cut-slope 7. In this embodiment, the blocks 5A are provided with cut-slopes 7.

Figure 2:
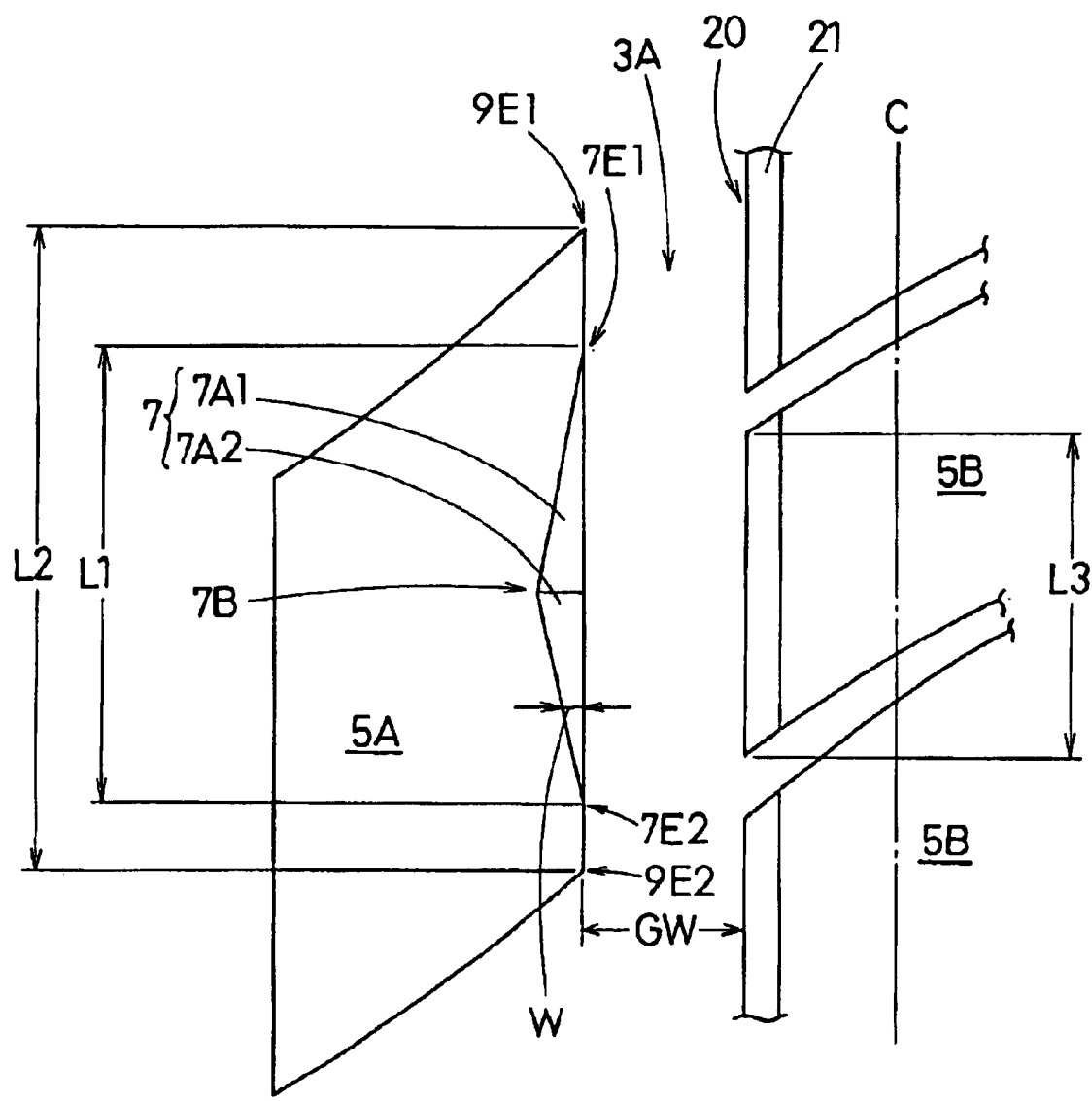
FIG. 2 is an enlarged plan view of a block provided with a cut-slope.
Figure 3:
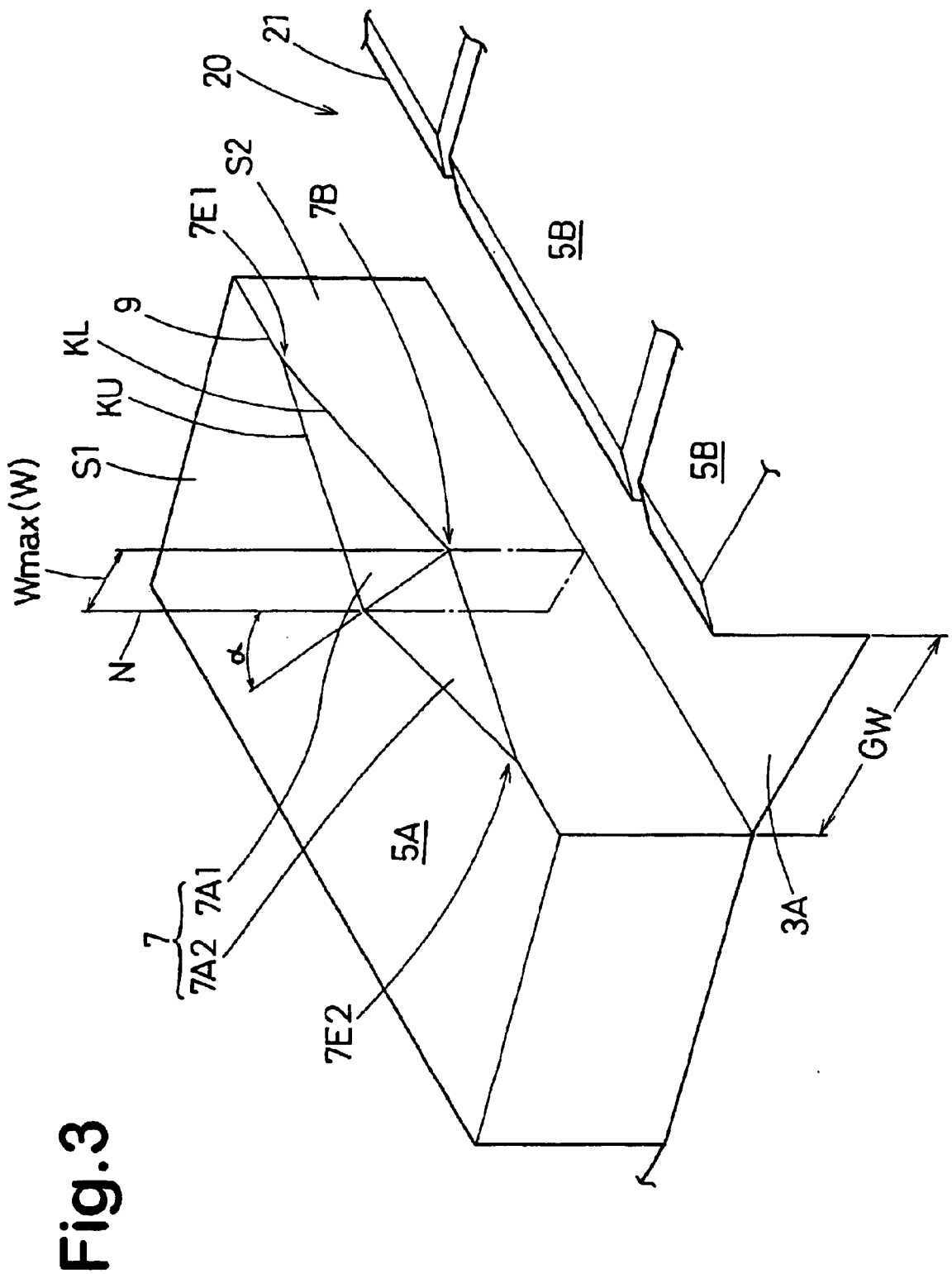
FIG. 3 is a perspective view of the block.

The cut-slope 7 is formed on an outside edge 9 or corner between the top surface S1 and a lateral face S2 of the block 5A, the lateral face S2 facing the wide longitudinal groove 3A. The lateral face S2 is substantially flat and substantially parallel to the tire equator. The cut-slope 7 gradually, in this example continuously, decreases in width from its middle point 7B towards each side thereof in the tire circumferential direction. The upper edge KU between the cut-slope 7 and the top surface S1 is V-shaped as shown in FIG. 2. Also the lower edge KL between the cut-slope 7 and the lateral face S2 is V-shaped. As a result, as shown in FIG. 3, the cut-slope 7 has a generally rhombic shape made up of two opposite isosceles triangles 7A1 and 7A2 having one base in common. Each triangle 7A1, 7A2 is substantially flat. Thus, the cut-slope 7 is bent along the above-mentioned base and caved into the block.

In a tire meridian section, the cut-slope 7 has a slope angle (alpha) in a range of from 40 to 70 degrees with respect to a normal line N to the top surface S1, and the axial width or distance W between the upper edge KU and lower edge KL becomes maximum (Wmax) at the middle point 7B and the maximum distance (Wmax) is set in a range of from 20 to 40% of the axial width GW of the groove bottom of the adjacent longitudinal groove, namely, wide longitudinal groove 3A. The axial distance W becomes zero at the circumferential ends 7E1 and 7E2 of the cut-slope 7.

The circumferential length L1 of the cut-slope 7 between the ends 7E1 and 7E2 is set in a range of from 50 to 80% of the circumferential length L2 of the outside edge 9 of the block 5A. Accordingly, the remainder of the outside edge 9 whose length is 50 to 20% is angled. In FIG. 2, at the end 9E1 of the outside edge 9, an acute angled corer is formed between the outside edge 9 and the adjacent edge. However, at the end 9E2 of the outside edge 9, an obtuse angled corer is formed between the outside edge 9 and the adjacent edge. In such a case, it is preferable that the length of the above-mentioned remainder of the outside edge 9 is shared such that the length between 9E1 and 7E1 is greater than the length between 9E2 and 7E2.

In FIG. 1, due to the above-mentioned difference in the pitch number between the lateral grooves 4A and lateral grooves 4B, the circumferential lengths L2 of the edges 9 of the blocks 5A are about 200% of the circumferential lengths L3 of the edges 20 of the blocks 5B. It is not always necessary to set at about 200%, but it is preferably set in a range of from 150 to 250%.

In this embodiment, further, the blocks 5Bi adjacent to the wide longitudinal groove 3A are each provided with a chamfer 21. The chamfer 21 is formed on the edge 20 or corner between the top surface and a lateral face facing the wide longitudinal groove 3A. Unlike the cut-slope 7 the chamfer 21 has a constant width along the length of the edge 20.

Figure 4:
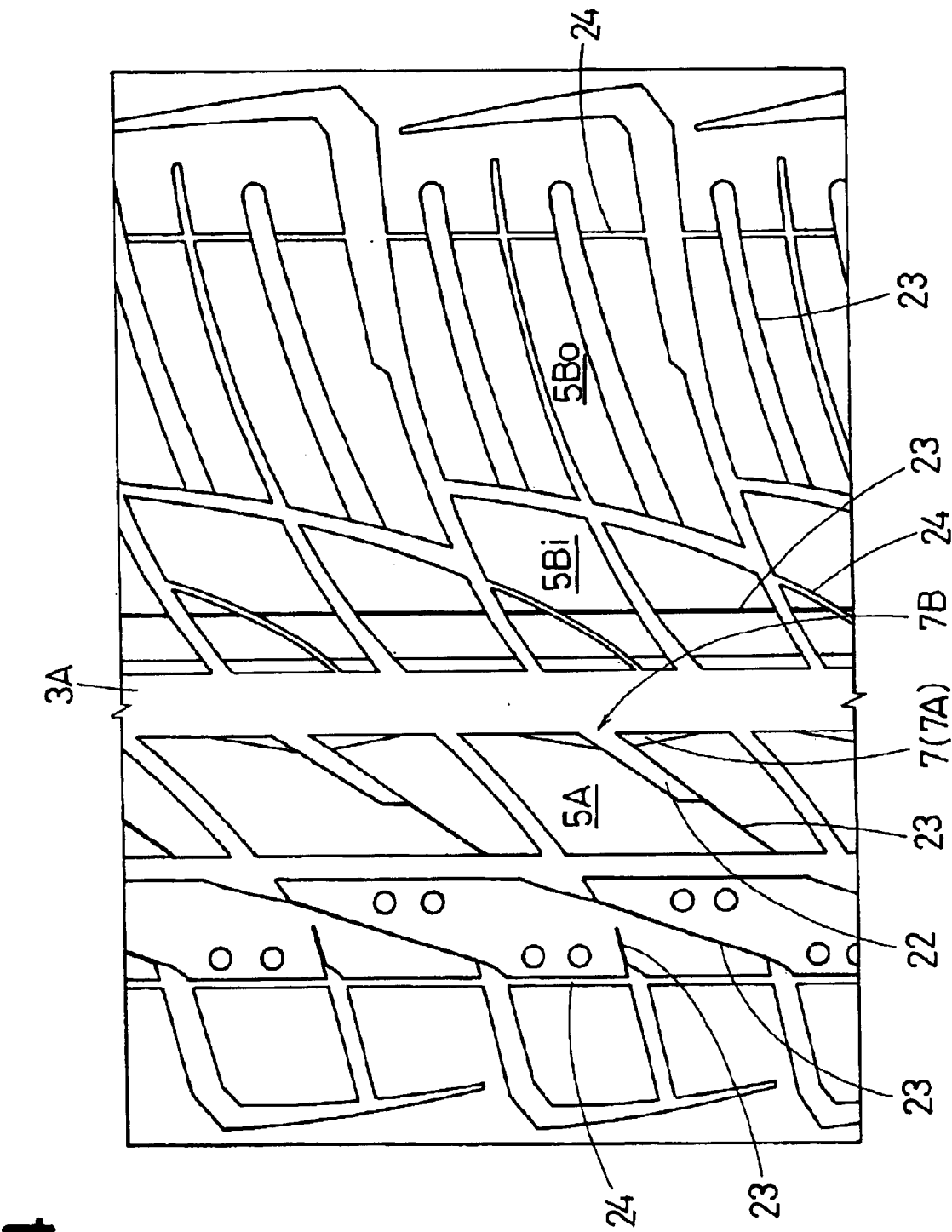
FIG. 4 shows a modification of the tread pattern shown in FIG. 1.

FIG. 4 shows a modification of the tread pattern shown in FIG. 1, which is further provided with axial grooves 22 and sipes 23. The blocks 5A are each provided with an axial groove 22 which extends from the widest middle point 7B of the cut-slope 7 and terminates within the block 5A.

By providing the cut-slopes 7 as explained above, cornering power is decreased and the vehicle overturn margin is heightened while maintaining a necessary block rigidity. Even if the blocks 5A are deformed during high speed cornering or when the steering wheel is turned quickly at a high speed, an abrupt change in the side force may be avoided. Thus, handling feel and vehicle attitude further uneven wear performance may be prevented from deteriorating. The cut-slopes 7 promote a flow of water existing between the road surface and the blocks 5A towards the wide longitudinal groove 3A. Thus, wet performance may be further improved.

If the maximum width Wmax is less than 0.2 XGW and/or the slope angle alpha is more than 70 degrees, then vehicle overturn margin, uneven wear, handling feel can not be effectively improved. If the maximum width Wmax is more than 0.4 XGW and/or the slope angle is less than 40 degrees, then the appearance of the worn tread and handling feel are liable to deteriorate. If the groove bottom width GW is increased, then the possibility of ground contact of the cut-slope 7 becomes greater. Therefore, it is effective to limit the maximum width Wmax in relation to the groove bottom width GW.

The above-mentioned axial grooves 22 decrease the ground contacting area of the blocks 5A and thereby the cornering power and friction are decreased to increase the vehicle overturn margin. The sipes 23 are utilized to make the rigidity even throughout the tread portion.

Comparison Tests

Test tires of size 205/65R15 (rim size 15×6.5JJ) for recreational vehicles having the same structure and the same tread pattern shown in FIG. 4 except for the cut-slope were made and tested for wear resistance, cornering power, wet performance and handling feel.

The test results and the tire specifications are given in Table 1.

1) Cornering Power Test (Vehicle Overturn Margin Test)

Using a tire test drum, the cornering power was measured under the following conditions: a running speed of 80 km/hr, a tire load of 5.18 KN and a tire inflation pressure of 200 kPa. The results are indicated by an index based on Ref.1 being 100, wherein the larger index number means the lower cornering power and accordingly the vehicle overturn margin is higher.

2) Wear Resistance Test

A test vehicle (FF-type seven-seat minivan) provided on all the wheels with test tires was run for a certain distance of about 8,000 kilometers (expressway 50%, highway 35%, mountain road 15%), and then visual inspection was made to evaluate the resistance to wear. The results are indicated by an index based on Ref.1 being 100, wherein the larger the index number, the higher the resistance. (tire inflation pressure 230 kPa)

3) Wet Performance Test

The above-mentioned test vehicle was run at a speed of 80 km/hr along a 100 meter radius circle on a wet asphalt road provided with a 5 mm depth 20 m long water pool and the lateral acceleration (lateral G) was measured. The results are indicated by an index based on Ref.1 being 100, wherein the higher the index number the better the wet performance.

4) Handling Feel Test

During running the above-mentioned test vehicle on a dry asphalt road in the tire test course, the handling feel was evaluated by the test driver. The results are indicated by an index based on Ref.1 being 100, wherein the larger the index number, the better the handling feel.

What is claimed is:

1. A pneumatic tire comprising a tread portion with at least one longitudinal groove extending in the tire circumferential direction and blocks adjacent to one side of said at least one longitudinal groove, each said block provided with a cut-slope on a corner between the top surface and a lateral face of the block, said lateral face facing the longitudinal groove, said cut-slope inclining towards the bottom of the longitudinal groove, and the axial width of the cut-slope gradually decreasing from a middle point of the cut-slope towards each side thereof in the circumferential direction, wherein the circumferential length of the cut-slope is in a range of from 50 to 80% of the circumferential length of said corner of the block, and in a tire meridian section, the cut-slope has an inclination angle of from 40 to 70 degrees with respect to the normal direction to the tread surface.

2. A pneumatic tire according to claim 1, wherein the maximum of the axial width at the middle point is in a range of from 20 to 40% of a groove bottom width of the longitudinal groove at said bottom.

3. A pneumatic tire according to claim 2, wherein said block is provided with an axial groove extending from said middle point and terminating in the block.

4. A pneumatic tire according to claim 3, wherein said at least one longitudinal groove is a circumferentially continuously extending substantially straight groove disposed on one side of the tire equator, and said blocks are disposed on an axially outer side of the longitudinal groove.

5. A pneumatic tire according to claim 4, wherein each said block is such that the circumferential length is greater than the axial width, and

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 | Ref. 2 |
|---|---|---|---|---|---|---|---|---|---|---|---|
| Tread width TW (mm) | 170 | 170 | 170 | 170 | 170 | 170 | 170 | 170 | 170 | 170 | 170 |
| Groove bottom width GW (mm) | 10 | 10 | 10 | 10 | 10 | 10 | 10 | 10 | 10 | 10 | 10 |
| Cut-slope | none | | | | | | | | | | |
| Slope angle (deg.) | — | 70 | 50 | 30 | 50 | 50 | 50 | 50 | 50 | 50 | 50 |
| Wmax (mm) | — | 2.0 | 2.0 | 2.0 | 1.0 | 2.0 | 4.0 | 6.0 | 2.0 | 2.0 | 2.0 *1 |
| Wmax/GW | — | .20 | .20 | .20 | .10 | .20 | .40 | .60 | .20 | .20 | .20 |
| L1 (mm) | — | 40 | 40 | 40 | 40 | 40 | 40 | 40 | 30 | 60 | 70 |
| L2 (mm) | 70 | 70 | 70 | 70 | 70 | 70 | 70 | 70 | 70 | 70 | 70 |
| L3 (mm) | 35 | 35 | 35 | 35 | 35 | 35 | 35 | 35 | 35 | 35 | 35 |
| L1/L2 | — | .57 | .57 | .57 | .57 | .57 | .57 | .57 | .43 | .86 | 1.0 |
| L2/L3 | 2.0 | 2.0 | 2.0 | 2.0 | 2.0 | 2.0 | 2.0 | 2.0 | 2.0 | 2.0 | 2.0 |
| Overturn margin | 100 | 100 | 102 | 103 | 102 | 102 | 105 | 107 | 102 | 107 | 95 |
| Wear resistance | 100 | 102 | 105 | 102 | 105 | 107 | 110 | 100 | 100 | 100 | 98 |
| Wet performance | 100 | 106 | 112 | 120 | 105 | 110 | 120 | 123 | 103 | 110 | 120 |
| Handling feel | 100 | 108 | 110 | 100 | 101 | 103 | 105 | 100 | 102 | 105 | 90 |

*1 Constant

From the test results, it was confirmed that Example tires can be improved in the marginal performance on vehicle overturn, wear resistance, wet performance and handling feel.

on the other side of the longitudinal groove, second blocks are disposed wherein each said second block is such that the axial width is greater than the circumferential length.

6. A pneumatic tire according to claim 1, wherein
said block is provided with an axial groove extending from said middle point and terminating in the block.

7. A pneumatic tire according to claim 1, wherein
said at least one longitudinal groove is a circumferentially continuously extending substantially straight groove disposed on one side of the tire equator, and
said blocks are disposed on an axially outer side of the longitudinal groove.

8. A pneumatic tire according to claim 7, wherein
each said block is such that the circumferential length is greater than the axial width, and
on the other side of the longitudinal groove, second blocks are disposed wherein each said second block is such that the axial width is greater than the circumferential length.

9. A pneumatic tire according to claim 1, wherein
the circumferential length of the cut-slope is in a range of from 57 to 80% of the circumferential length of said corner of the block.

10. A pneumatic tire according to claim 1, wherein
the cut-slope in the tire meridian section has an inclination angle of from 50 to 70 degrees with respect to the normal direction to the tread surface.

* * * * *